US008797147B2

(12) United States Patent
Kaga et al.

(10) Patent No.: US 8,797,147 B2

(45) **Date of Patent: *Aug. 5, 2014**

(54) UPRIGHT TYPE APPARATUS FOR CHARGING WIRELESS IC TAGS

(75) Inventors: Kikuo Kaga, Tokyo (JP); Shigeo Ashizawa, Tokyo (JP)

(73) Assignee: Mitomo Corporation, Kanagawa (JP)

( * ) Notice: Subject to any disclaimer, the term of this patent is extended or adjusted under 35 U.S.C. 154(b) by 157 days.

This patent is subject to a terminal disclaimer.

(21) Appl. No.: 13/389,337

(22) PCT Filed: May 9, 2011

(86) PCT No.: PCT/JP2011/061114

§ 371 (c)(1), (2), (4) Date: Feb. 7, 2012

(87) PCT Pub. No.: WO2012/101839

PCT Pub. Date: Aug. 2, 2012

(65) Prior Publication Data

US 2012/0274453 A1 Nov. 1, 2012

(30) Foreign Application Priority Data

Jan. 24, 2011 (JP) ................................ 2011-012083

(51) Int. Cl.
*H04Q 5/22* (2006.01)

(52) U.S. Cl.
USPC ...................................... 340/10.5; 340/10.51

(58) Field of Classification Search
USPC .......... 340/10.1–10.52, 572.1–572.9, 539.22, 340/539.24, 540, 603, 665; 222/195–196; 366/39; 221/163, 167–169
See application file for complete search history.

(56) References Cited

U.S. PATENT DOCUMENTS

| | | | | |
|---|---|---|---|---|
| 4,361,202 | A * | 11/1982 | Minovitch | 180/168 |
| 6,064,301 | A * | 5/2000 | Takahashi et al. | 340/435 |
| 2005/0063125 | A1* | 3/2005 | Kato | 361/113 |
| 2008/0252483 | A1* | 10/2008 | Hodges | 340/905 |
| 2009/0072978 | A1* | 3/2009 | Tilson, Jr. | 340/572.9 |
| 2009/0121872 | A1* | 5/2009 | Lynch et al. | 340/572.1 |
| 2010/0289647 | A1* | 11/2010 | Rudduck et al. | 340/572.1 |
| 2010/0295694 | A1* | 11/2010 | Kauffman et al. | 340/665 |
| 2011/0043373 | A1* | 2/2011 | Best et al. | 340/825.49 |
| 2011/0073250 | A1* | 3/2011 | Muirhead | 156/256 |

FOREIGN PATENT DOCUMENTS

| | | |
|---|---|---|
| JP | 2006-145385 | 6/2006 |
| JP | 2008-63900 | 3/2008 |

* cited by examiner

*Primary Examiner* — Hai Phan
*Assistant Examiner* — Orlando Bousono
(74) *Attorney, Agent, or Firm* — Wenderoth, Lind & Ponack, L.L.P.

(57) ABSTRACT

An upright type apparatus for embedding wireless IC tags, the upright apparatus including: a vibration alignment unit for aligning the wireless IC tags in the same direction by applying a vibrating force to the wireless IC tags; a separating unit for separating the wireless IC tags aligned by the vibration alignment unit and dropping the separated wireless IC tags one by one into a vertically-dropping passage; a plurality of IC tag processing units disposed along the vertically-dropping passage in a vertical direction; a plurality of IC tag pressure feeding sections disposed at a lateral side of the plurality of IC tag processing units, respectively; and a defective wireless IC tag reception section provided beneath the vertically-dropping passage.

20 Claims, 8 Drawing Sheets

(a) FIG7

UPRIGHT TYPE APPARATUS FOR CHARGING WIRELESS IC TAGS

1. FIELD OF THE INVENTION

The present invention relates to an upright type apparatus for embedding wireless IC tags, particularly to an apparatus for embedding wireless IC tags, to which various data required for quality management are written, or from which the data having been written to wireless IC tags are read out, prior to the embedding of wireless IC tags by means of radio communication, to an object, such as a kneaded material prepared in any of liquid, viscous or semi-solid state, after writing/reading-out the data to/from the wireless IC tags.

2. BACKGROUND ART

In concrete constructs, for example, it is known that wireless IC tags, to which various information on a product have been written in view of investigating strength against earthquake and/or verifying the history of constructions, are incorporated to concrete constructs, so as to manage the quality of the concrete, the history of the constructions, etc. based on a management system using the wireless IC tags. Further, the quality management in which wireless IC tags are used has been desired in view of traceability not only for concrete constructs but also daily necessaries such as resin-molded commodities.

For preparations, such as unhardened concrete and thermoplastic resins, which assume any of liquid, viscous or semi-solid state during the manufacturing process, the wireless IC tags can be utilized for product management for the individual preparations by writing various data to the wireless IC tags beforehand, embedding the wireless IC tags having been written with the data to an unhardened preparation, and then enclosing those wireless IC tags inside the preparation, and writing/reading-out data to/from the wireless IC tags enclosed inside the hardened preparation by means of radio communication. Moreover, because the wireless IC tags are enclosed inside the preparations, there is such an advantage that the subsequent step of embedding or incorporating wireless IC tags to the preparations is not required.

On the other hand, a method of quality management for concrete constructs has been proposed, in which wireless IC tags are embedded into unhardened concrete received in a concrete mixer mounted on a vehicle, and information on the manufacturing of unhardened concrete is written to the incorporated wireless IC tags at the time of casting the unhardened concrete to thereby build a concrete construct provided with various information at the time of manufacturing (Patent Document 1). Additionally, a quality management system, in which the quality management of concrete is implemented by using wireless IC tags having been incorporated to unhardened concrete during the manufacturing process, and unhardened concrete containing wireless IC tags has been disclosed (Patent Document 2).

These systems are structured in such a procedure that unhardened concrete is mixed/kneaded with wireless IC tags, information on the unhardened concrete and the casting thereof, or information as to a concrete construct built after casting the unhardened concrete is written to the wireless IC tags, and reading out the data upon requirement to thereby implement the quality management of the concrete construct. In those documents, however, the means for writing data to wireless IC tags and the constitution of the apparatus for embedding wireless IC tags are not clearly disclosed.

[Patent Document 1]: Japanese Unexamined Patent Application Publication No. 2006-145385

[Patent Document 2]: Japanese Unexamined Patent Application Publication No. 2008-63900

SUMMARY OF INVENTION

In the quality management system for concrete constructs described above, in which the conventional wireless IC tags are mixed to unhardened concrete, it is required to firmly and accurately write predetermined data to wireless IC tags in the embedding step and to prevent the wireless IC tags from being clogged due to appearance of power dust inside the embedding apparatus, particularly at the entrance portion thereof. However, the conventional apparatus for embedding wireless IC tags of the type as described above is configured to feed wireless IC tags to a data writing/reading-out unit while simply giving vibration so that the wireless IC tags supplied from a hopper should not be clogged. As a result, the orientation of wireless IC tag faces whereto data is written cannot be aligned, causing errors in writing data to wireless IC tags.

Further, the type of the conventional apparatus is configured to drop wireless IC tags by virtue of gravitation from the embedding apparatus to the object. Consequently, there is such a problem with the apparatus that dust of cement, which is the object for embedding, could flow into air to thereby cause clogging at an outlet of the embedding apparatus, and that the embedding apparatus is required to be positioned directly over a mixing vessel containing the object for embedding, or to be set in the close vicinity of a mixing vessel even though a pipe for feeding/dropping wireless IC tags is used.

In general, mixing/kneading of unhardened concrete is implemented by measuring sand, gravel or crushed rocks, water, etc., embedding/kneading them to/in a mixing vessel, and feeding the mixture into a mixer mounted on a vehicle, and these serial operations must be completed within 40 minutes. Therefore, all operations including measuring the components of unhardened concrete, writing data to IC tags and embedding IC tags must be done within 15 to 25 seconds based on the reverse calculation. Since an incorporation of wireless IC tags to a mixing vessel is required to be completed quickly, it is so required that no adverse effect is exerted to a normal numbers of wireless IC tags in total to be embedded to unhardened concrete even though errors in writing data may occur.

Therefore, it is an object of the present invention to provide an apparatus for embedding wireless IC tags of the upright type, which requires a less grounding area, may be set at a free position away from a mixing vessel to be used for mixing/kneading wireless IC tags with the object for embedding, can embed a plurality of wireless IC tags over a wide range above the mixing vessel, and can embed a number of wireless IC tags within a short time.

It is another object of the present invention to provide an apparatus for embedding wireless IC tags of the upright type, which can be switched on/off the apparatus remotely and by only designated persons, and the embedding operation of which can be monitored from places other than the operating site.

It is still another object of the present invention to provide an apparatus for embedding wireless IC tags of the upright type, which can work continuously without affecting the total amount of wireless IC tags to be embedded, even if a part of the apparatus developed trouble, by unitizing the wireless IC tag embedding mechanism section, the data writing/reading-out section, the writing error detection section, and the defective product distribution section, individually, and positioning those units in a vertical direction.

An upright type apparatus for embedding wireless IC tags according to the present invention comprises a vibration alignment unit for vibrating wireless IC tags to align them, a separating unit for separating the wireless IC tags fed in a aligned state into one by one to drop them to a vertically-dropping passage, a plurality of IC tag processing unit arranged along the vertically-dropping passage at the upper and lower sides, IC tag pressure feeding unit arranged to the lateral side of each of the units, defective IC tag reception section provided to the bottom part of the apparatus, and a control unit for controlling the operations of the units, respectively, and is characterized in that the IC tag processing unit comprises a stopper section for opening/blocking the vertically-dropping passage, a distribution section arranged beneath the stopper section and adapted to receive wireless IC tags on the vertically-dropping passage to distribute them so that they are pushed to the IC tag pressure feeding section and are dropped to an area beneath the vertically-dropping passage, a data writing section arranged at the position of the stopper section for writing data to wireless IC tags on the stopper section by means of radio communication, and a data reading-out section arranged at the position of the distribution section for reading out data written in wireless IC tags from the wireless IC tags being received in the distribution section by means of radio communication.

Besides, an embodiment according to the present invention is characterized in that, among the plurality of IC tag processing units, the units other than the units which are processing wireless IC tags are maintained in the opened condition.

A still another embodiment according to the present invention is characterized in that the control unit controls the operations of processing wireless IC tags are implemented in series by the IC tag processing units in order of proceeding from the unit locating at the upper stage to the unit locating at the lower stage.

A still another embodiment according to the present invention is characterized in that the data reading-out section may also function as the defective IC tag detection means for detecting errors in writing data to the wireless IC tags.

A still another embodiment according to the present invention is characterized in that the defective IC tag reception section provided to the lower section of the apparatus is disposed beneath the vertically-dropping passage, and that the defective IC tags in which an error in writing data has been detected drop from the distribution section to the vertically-dropping passage and are then received in the defective IC tag reception section.

A still another embodiment according to the present invention is characterized in that the object for embedding wireless IC tags is a material assuming any of liquid, viscous or semi-solid states, and having been received in a mixing vessel.

A still another embodiment according to the present invention is characterized in that the object for embedding wireless IC tags is unhardened concrete prepared by mixing/kneading cement, water and aggregate, and having been received in a mixing vessel.

A still another embodiment according to the present invention is characterized in that the vibration alignment unit includes a concave disc for receiving wireless IC tags, a round feeding path formed at the outer peripheral of the concave disc, and a vibration driving member for vibrating the concave disc and the round feeding path, and the round feeding path includes an IC tag inlet that connects to the concave disc at one end and an outlet that connects to an IC tag dropping chute at the other end.

A still another embodiment according to the present invention is characterized in that the vibration alignment unit includes an opening for detachably mounting a cartridge that is configured to contain wireless IC tags.

A still another embodiment according to the present invention is characterized in that the IC tag dropping chute is provided with a counting means for counting the numbers of wireless IC tags having passed through the IC tag dropping chute.

A still another embodiment according to the present invention is characterized in that the IC tag pressure feeding section is connected with a hose used for releasing the wireless IC tags.

A still another embodiment according to the present invention is characterized in that a sensor unit including a sensor mechanism for detecting the feeding of the wireless IC tags is provided to the distal end of the hose, which is adapted to be connected to an air outlet of the IC tag pressure feeding section.

A still another embodiment according to the present invention is characterized in that the apparatus includes a remotely-operable power source for actuating the apparatus and is capable of monitoring the operating condition of the apparatus via an Internet system.

A still another embodiment according to the present invention is characterized in that the power source for actuating the apparatus may be remotely operated in response to an input of touch panel board ID.

A still another embodiment according to the present invention is characterized in that the radio communication means is a non-contact type radio communication means, which is electrically connected with a database either by cable or wirelessly, and implements radio communication by outputting radio electric waves at a preset frequency to the antenna section of the wireless IC tags to write product information data stored in the database to the wireless IC tags.

A still another embodiment according to the present invention is characterized in that the wireless IC tag is a wireless IC tag which can write and/or read out data by means of radio communication with the radio communication means, the wireless IC tag is configured in such a manner that a ferroelectric memory, which uses a ferroelectric that includes a power source section for receiving radio electric waves from the radio communication means and resonate with the radio electric waves to generate current and an antenna section for carrying out radio communication at a preset frequency, is mounted on a substrate to thereby store the data in the ferroelectric memory, and that a radio communication unit which outputs radio electric waves in the communication frequency band used for the wireless IC tags is used as the radio communication means.

By virtue of configuring the upright type apparatus for embedding wireless IC tags according to the present invention by unitizing the IC tag processing section comprising an IC tag incorporation mechanism section, a writing/reading-out section and an error detection section, into each independent units, and by arranging those plural units in a vertical direction, it is possible to reduce an area required for setting the apparatus and to embed a number of wireless IC tags over a wide range of a mixing vessel within a short time. Further, even if a part of the apparatus has developed trouble, it is enough to fix only the part with such trouble, and the amount of wireless IC tags can be altered easily upon requirement by increasing/decreasing the numbers of the units to operate.

DESCRIPTION OF THE REFERENCE NUMERALS

Figure 1:
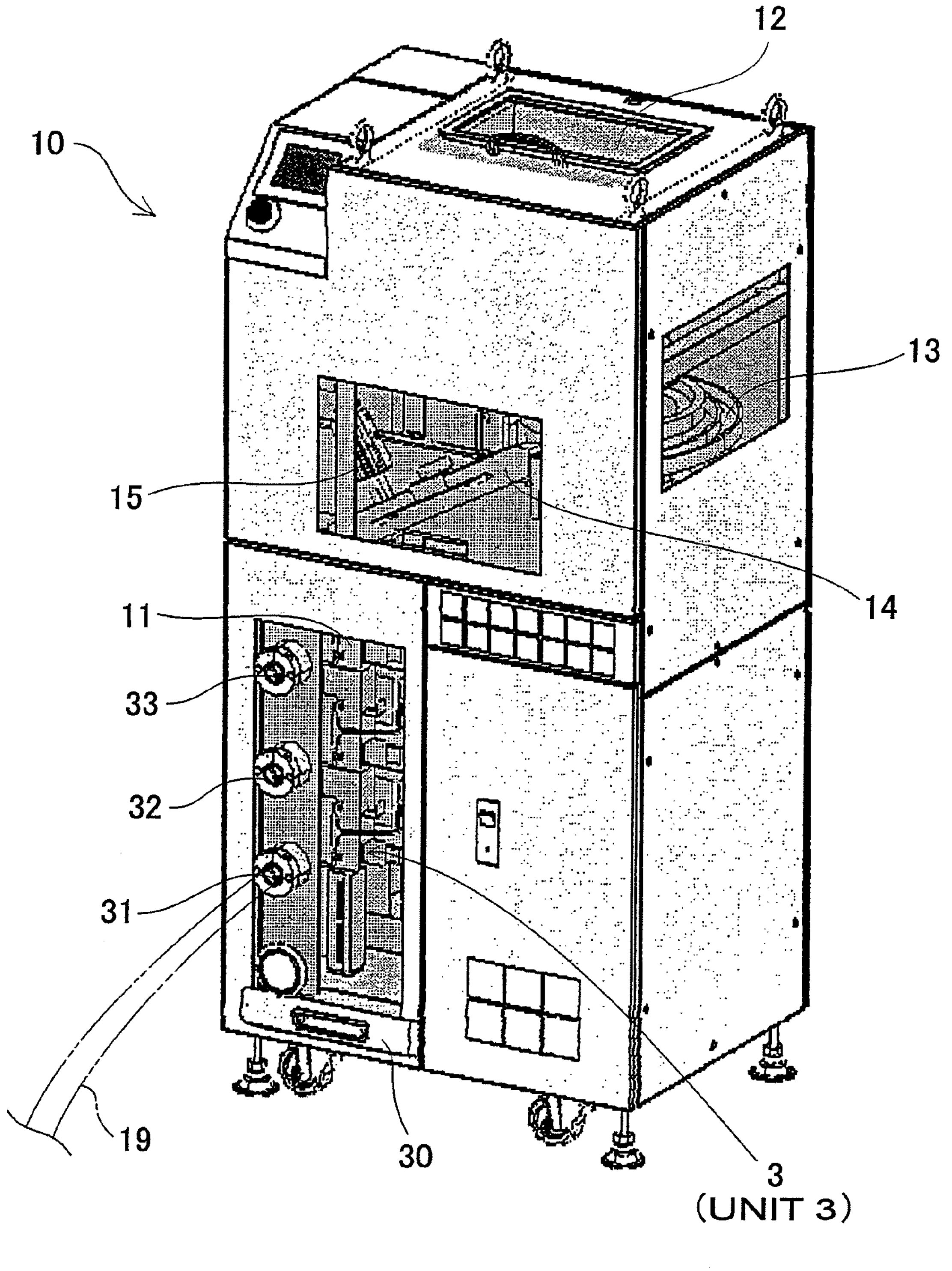
FIG. 1A planar view showing the whole appearance of the upright type apparatus for embedding wireless IC tags according to an embodiment of the present invention.

1. Wireless IC tag
10. Upright type apparatus for embedding wireless IC tag
11. Vertically-dropping passage
12. Hopper
14. Dropping chute
15. Separating section/unit
16. Stopper
31, 32, 33; Pressure feeding section
19. Hose
30. Defective IC tag reception section
36. Data writing unit
37. Data reading-out unit
40. Vibration alignment unit
51. Cartridge
60. Feeding mechanism
70. Distribution section
71. Distributing cylinder
72. Distributing plate
8. Wireless IC tag Now, the embodiments of the present invention will be explained with reference to the appended drawings. Note that, although an example wherein wireless IC tags are incorporated to unhardened concrete is described in the following, the object to which wireless IC tags are embedded is not limited to unhardened concrete, and any of liquid, viscous or semisolid material, such as thermoplastic resin in melting state, unhardened gypsum or the like can be applied as well.

Figure 7:
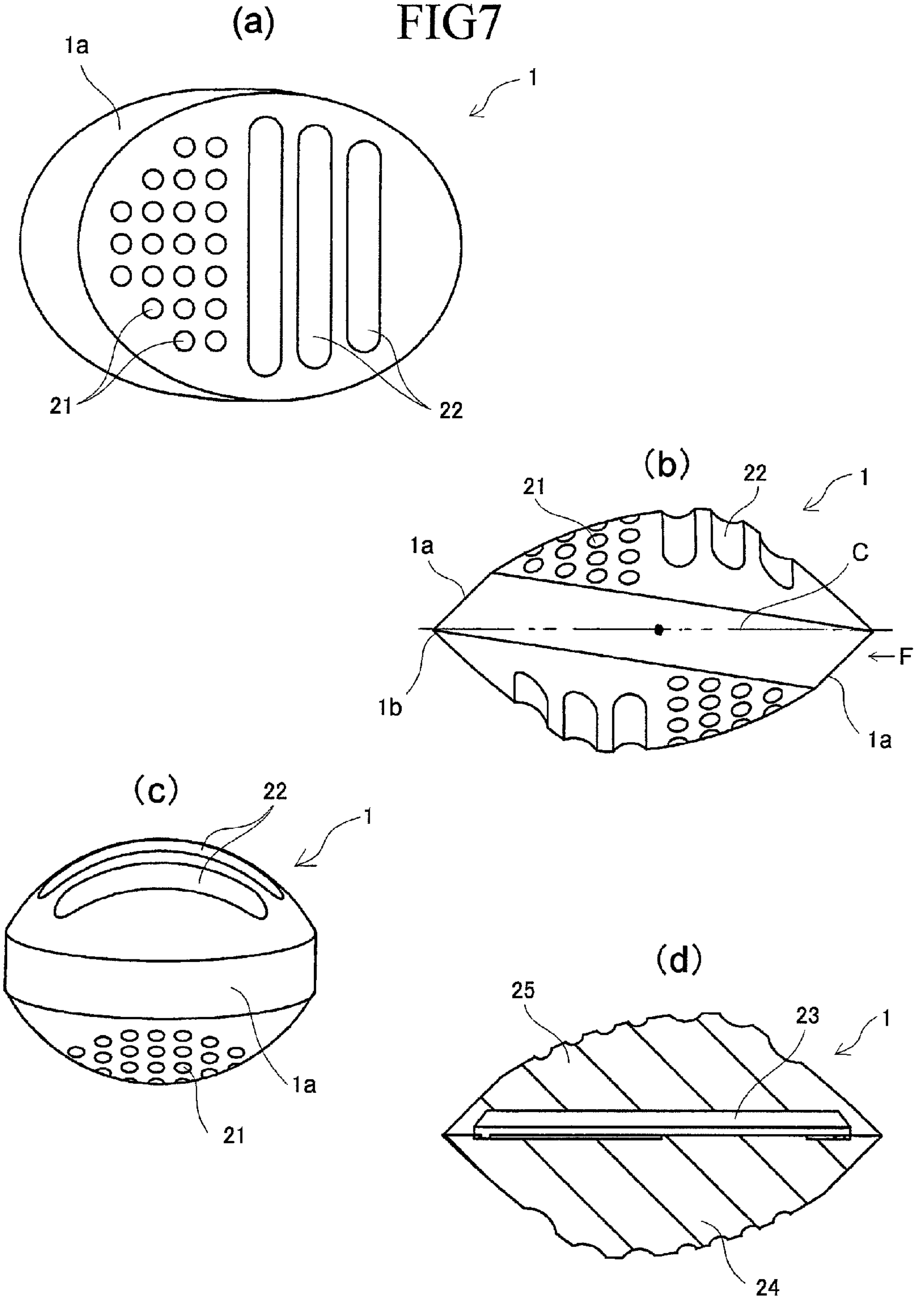
FIG. 7 Side views and transverse cross sectional views showing an example of the wireless IC tag, which is applicable to an embodiment of the present invention.

In the first place, an example of the wireless IC tag which is applicable to an embodiment of the present invention will be explained. As shown in FIG. 7, the wireless IC tag 1 used in this embodiment has an elliptic configuration in plan (FIG. 7(*a*)), and the upper and lower surface of the wireless IC tag assumes schematically circular shape in the front view (FIG. 7(*b*)). FIG. 7(*c*) is a right-side view seen from a direction shown with an arrow Fin FIG. 7(*b*). As shown in FIG. 7(*a*), one side of the upper surface which curves in a circular shape as a whole forms an inclined surface 1*a* toward the periphery, and a plurality of small round concaves 21 and plural elongated concaves 22 (3 concaves in the example of FIG. 7) are formed on the curved surface. The shape of the IC tag in the front view shown in FIG. 7 (*b*) is formed in point symmetric manner relative to the center O. Further, the bottom surface of IC tag is formed in symmetric to the upper surface thereof shown in FIG. 7(*a*), the back surface of IC tag 1 is symmetric to the front surface thereof shown in FIG. 7(*b*), and the left side of IC tag is symmetric to the right side thereof shown in FIG. 7(*c*). This wireless IC tag 1 is divided to the upper and lower portions along the central line C shown in the front view of FIG. 7(*b*), and a concave 23 adapted to receive a plate-like IC chip (not shown) is formed in the divided surface as shown in FIG. 7(*d*). Following to that the wireless IC chip 1 was received in the concave 23, the divided halves 24, 25 are integrally adhered so that a wireless IC tag is obtained.

Because of that both of the right and left side edges 1*b* of the wireless IC tag 1 configured as described above get sharp due to the adhesion of the inclined surface 1*a*, it tends to easily penetrate more deep into unhardened concrete during the mixing operation when it is embedded to the unhardened concrete. Further, the fixing property of wireless IC tag to unhardened concrete is improved by a plurality of small round concaves 21 formed on the upper and bottom surfaces, and the cohesion property with unhardened concrete is improved by elongated concaves 22 provided to the upper and bottom surfaces of the wireless IC tag. In addition, because the IC chip inserted to the wireless IC tag has a plate shape with a large area, it is made possible to implement data writing/reading-out via radio communication means from an arbitrary direction to the wireless IC tag. Note that the wireless IC tag applied to this invention is not limited to the ones as described above, the other ones having different shapes, such as a bale shape with a cylindrical periphery, may also be used.

The outer shell of the wireless IC tag is formed with a thermoplastic resin material, and the wireless IC tag chip to be inserted is a memory element capable of writing/reading-out data, which is called as RFID. For example, FeRAM chip, a ferroelectric memory using a ferroelectric as a memory element used for an IC tag is mounted onto a substrate comprising a metal plate, a ceramic plate or the like.

Any type of FeRAM, such as a capacitor-type, a transistor-type or the like, may be used to constitute an FeRAM chip for a wireless IC tag. Note that an FeRAM which is easy to use for a product management system, etc. is a passive-type FeRAM which does not mount a power source on itself, but commutates electric waves used for data access from the outside to use them as a power source. To this type of FeRAM chip, an FeRAM, which is a non-volatile memory using a ferroelectric, a power source section, which receives electric waves from the outside and resonate to generate current without mounting a battery for driving, and a film-like antenna section are mounted.

Figure 8:
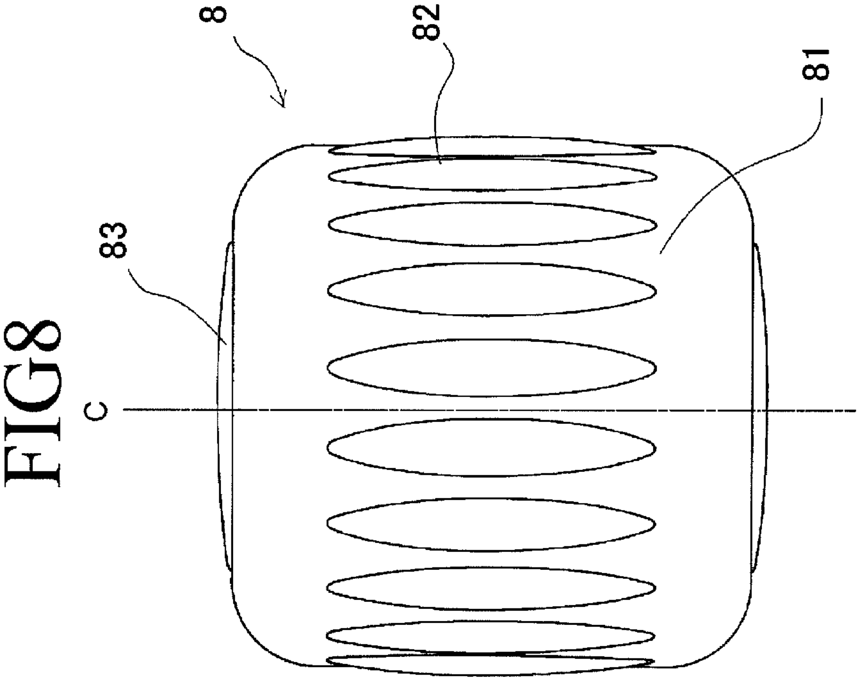
FIG. 8 A side view showing an example of the wireless IC tag, which is applicable to an embodiment of the present invention.

Note that the bale-shaped wireless IC tag 8 shown in FIG. 8 can pass smoothly through the passage in the embedding apparatus, which will be described later, while securing the orientation of IC tags and rolling on the peripheral portions of the passage. In this case, data writing/reading-out is implemented to the end surface of the bale-shaped tag. The wireless IC tag assumes a bale-like shape including both end surfaces 83 formed in a flat to slightly convex shape and cylindrical periphery 81, and it is formed symmetrically about the axis line (rotation axis line) C passing the center of the both end surfaces 83. On the periphery, a plurality of convex stripes are formed at an approximately even distance so that cohesion and compatible properties of the wireless IC tag with unhardened concrete can be obtained. Note that the outer shell of the bale-shaped tag 8 comprises a coating made of a thermoplastic resin material, and a wireless IC tag chip is enclosed in the center of the tag.

Figure 2:
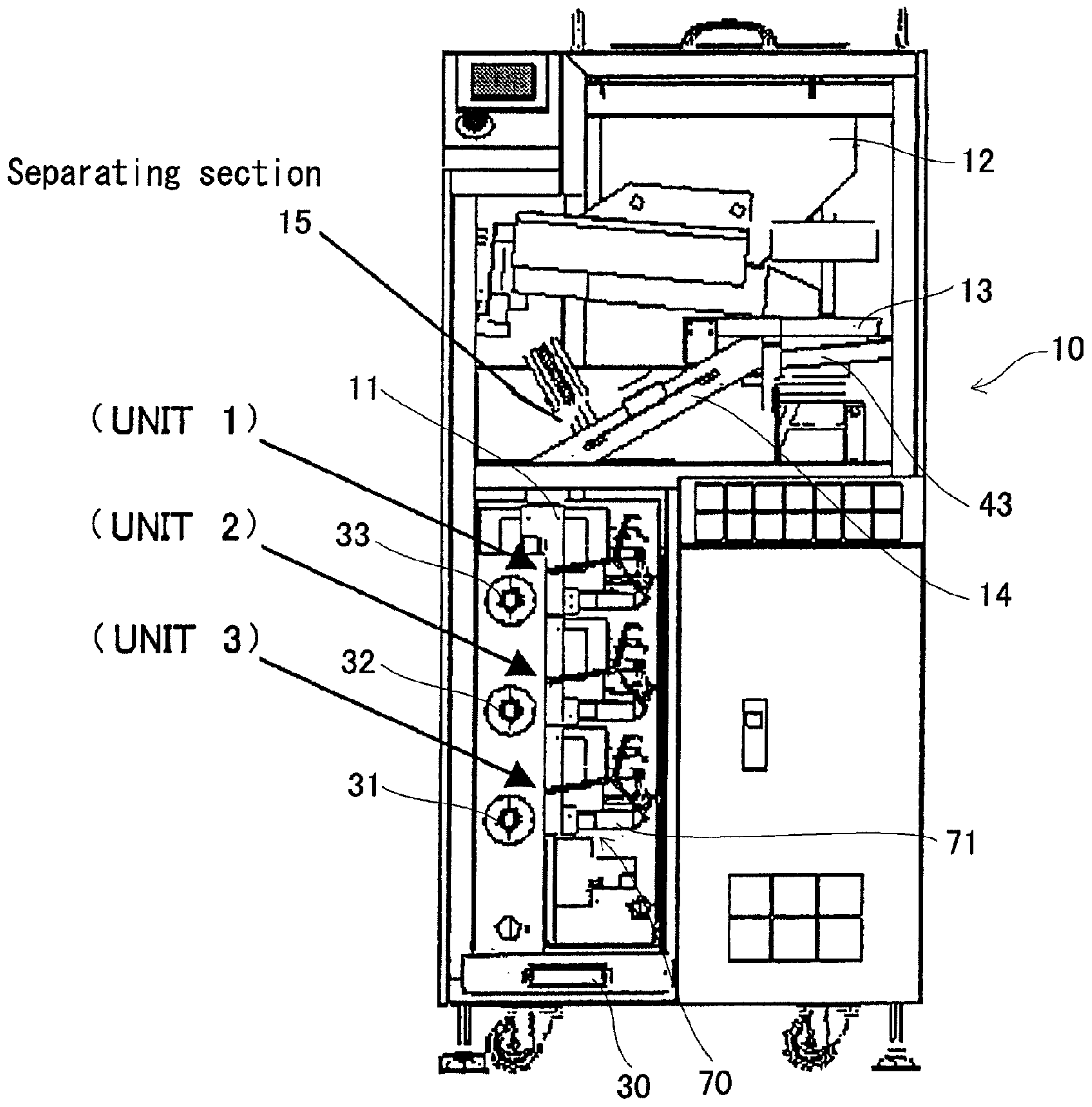
FIG. 2 A front view of the upright type apparatus for embedding wireless IC tags shown in FIG. 1.

FIG. 1 is a schematic planar view showing the whole structure of the upright type apparatus for processing data and embedding wireless IC tags according to an embodiment of the present invention when it is viewed from the front side, and FIG. 2 is a front view of the upright type apparatus for embedding wireless IC tags shown in FIG. 1. Now, the structure of the apparatus according to this embodiment and the embedding operation of wireless IC tags will be explained with referring to FIGS. 1 and 2. In this embodiment, the unitized IC tag processing sections are set in four stages in the vertical direction along the vertical IC tag dropping passage 11. Note that, in the example shown in FIG. 1, the apparatus is shown in a condition that the unit at the lowest stage among the four units has been removed as a matter of convenience.

At first, wireless IC tags received in a hopper 12 arranged at the top portion of the apparatus are fed to a vibration alignment unit 40, where the orientation of the wireless IC tags are aligned. Then, the wireless IC tags smoothly move and drop through an inclined dropping chute 14 to a separating section 15, where the wireless IC tags are fed one by one at a preset interval to a vertically-dropping passage 11 locating downward. At the time of starting the operation of the apparatus, the unit 3 locating at the lowest stage in this embodiment is in the closed state (the advanced state of stopper 16, described later), and the unit 1 at the highest stage and the unit 2 at the next stage are both in the opened state (the withdrawn state of stopper), whereby the vertically-dropping passage 11 is opened up to a position where it reaches to the unit 3 at the lowest stage. Therefore, the first wireless IC tags entered into the vertically-dropping passage 11 are received by the unit 3 at the lowest stage, and data writing and an operation combining detection of error in writing data with data reading-out are implemented in the unit 3. If no error in writing data is detected, the IC tags are pushed out to the pressure feeding section 31 locating at the lateral side of the unit 3 and embedded by means of pressurized air to a mixing vessel (not shown) at a high speed via a hose 19 (FIG. 1) connected to an air blowing outlet 18 locating at the front of the apparatus.

When errors in writing data in the wireless IC tag are detected in the unit 3, the distribution section 70 associated with the unit 3 works in response to the detection signal to open the vertically-dropping passage 11 locating at the position of the unit 3, whereby the defective IC tags are received in the defective IC tag reception section 30 provided at the lower section of the apparatus. On the other hand, the normal IC tags, for those which no error in writing data was detected, are fed to the pressure feeding section 31 locating at the lateral side by the distribution section 70 without dropping to the defective IC tag reception section 30. The reference numeral 71 denotes a distribution cylinder for actuating the distribution section 70.

AS described above, when the operation for the first group of wireless IC tags is finished, then the unit 1 at the highest stage and the unit 3 at the lowest stage are opened. At the same time, the distribution sections respectively associated to those units are also opened, while only the unit 2 at the second stage is closed. Therefore, the subsequent second group of wireless IC tags are received from the vertically-dropping passage 11 to the unit 2, and data writing to the second group of wireless IC tags is implemented in the unit 2 similarly to the case of the unit 3 described above, and followed by detection of errors in data writing. When no error in the data writing is detected, the wireless IC tags are pushed out by the distribution section of the unit 2 to the pressure feeding section 32 locating at the lateral side, which corresponds to the unit 2, and then embedded into the mixing vessel by means of pressurized air. When an error in data writing is detected, the distribution section of the unit 2 works to cause the vertically-dropping passage 11 locating at the position of the unit 2 to open, whereby the defective IC tags drop to the defective IC tag reception section 30 provided to the lower section of the apparatus.

In respect of the subsequent third group of wireless IC tags, the unit 1 stay in a closed state, and the unit 2 and the associated distribution section are opened, and the unit 3 and the associated distribution section are also opened. Then, as described above, operations such as data writing to the third group of wireless IC tags, detection of errors in data writing and feeding to the pressure feeding section 33 corresponding to the unit 1 are implemented in the unit 1 at the highest stage, and subsequently such operations described above are repeated in turn. Note that those repeated operations are carried out under the control of a control unit which works in response to signals from various sensors provided to the separating section 15 for the dropping chute 14 and the other parts.

Figure 4:
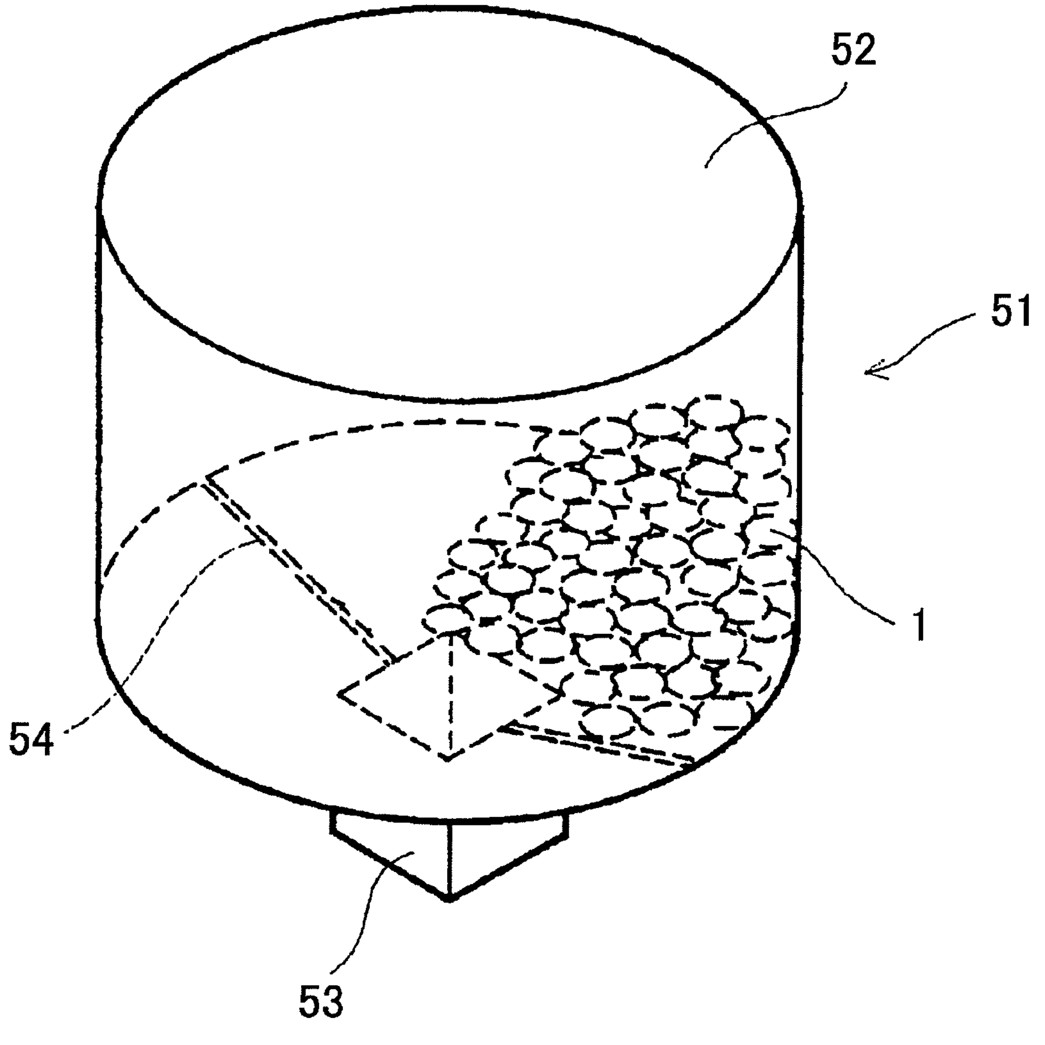
FIG. 4 A planar view showing an example of the cartridge adapted to contain wireless IC tags, which is applicable to an embodiment of the present invention.
Figure 5:
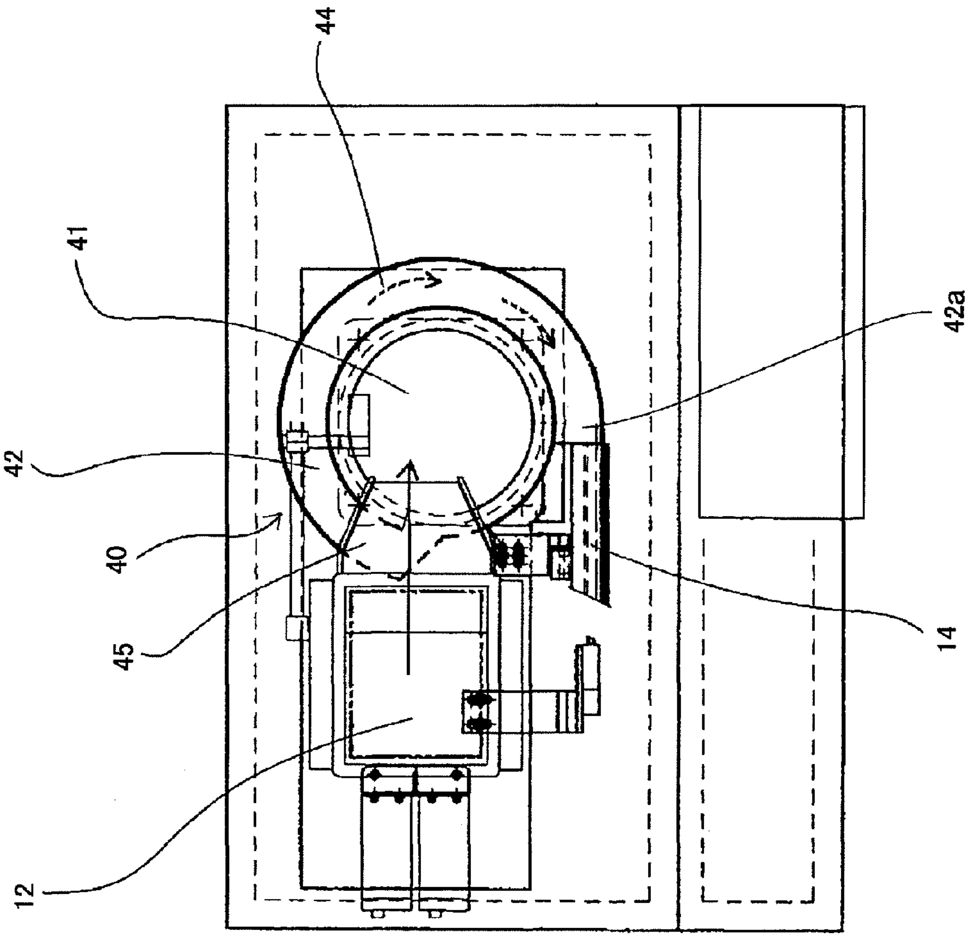
FIG. 5 A schematic planar view showing the vibration alignment section according to an embodiment of the present invention.

Now, the structure of the respective components of the apparatus will be explained specifically. FIG. 5 shows the vibration alignment unit 40 according to an embodiment of the present invention, and FIG. 4 shows an example of the IC tag cartridge to be mounted to the vibration alignment unit. Referring to FIG. 1 and FIG. 5, the vibration alignment unit 40 includes a concave disc 41, the bottom of which being sank like a dish, a round feeding path 42 surrounding the concave disc 41, and a vibration driving unit 43 (FIG. 2) disposed beneath the concave disc 41. The wireless IC tags contained in the hopper 12 are supplied to the concave disc 41 of the vibration alignment unit 40 through the chute 45, and the wireless IC tags are gradually fed in an aligned state, where the end sides of the wireless IC tags are contacted in series with each other, from the concave disc 41 to the round feeding path 42 as indicated with broken arrows 44 shown in FIG. 5 by virtue of vibrating action, then smoothly move or roll from the outlet 42*a* of the round feeding path 42 to the IC tag dropping chute 14, where the wireless IC tags are separated into one by one by the separating unit 15 and fed to the vertically-dropping passage 11.

The wireless IC tags 1 to be put to the hopper 12 may be supplied in the form of a cartridge 51 in which wireless IC tags are contained beforehand. The cartridge 51 containing wireless IC tags is mounted to an opening of the hopper 12 so that wireless IC tags 1 are put to the hopper 12. The outlet of the hopper 12 of the apparatus for processing data and embedding wireless IC tags is configured so that the cartridge 51 can be detachably mounted to the outlet of the hopper 12.

The cartridge 51 includes a cylindrical basket body 52 in which a plurality of wireless IC tags, to which data has not yet written, have been contained beforehand. An opening 53 adapted to fit to the outlet of the hopper 12 is formed in the bottom portion of the cartridge 51, so that wireless IC tags are dropped/put to the hopper 12 through this opening 53. Further, the bottom portion of the cartridge 51 is inclined toward the opening 53, and rail members 54 for guiding wireless IC tags to the opening 53 are formed on the bottom portion. Note that the shape of the cartridge 51 shown above is just an example, and the cartridge 51 may be configured in the other shapes.

When the amount of wireless IC tags 1 in the hopper 12 became short, wireless IC tags 1 can be supplied/supplemented easily by replacing the cartridge 51. Further, by enclosing the cartridge 51 after embedding wireless IC tags therein, it is possible to prevent the other wireless IC tags and/or forged wireless IC tags from being mingled, whereby the implementation of quality management system for a concrete construct can be achieved securely by using wireless IC tags to which correct data have been written.

Figure 6:
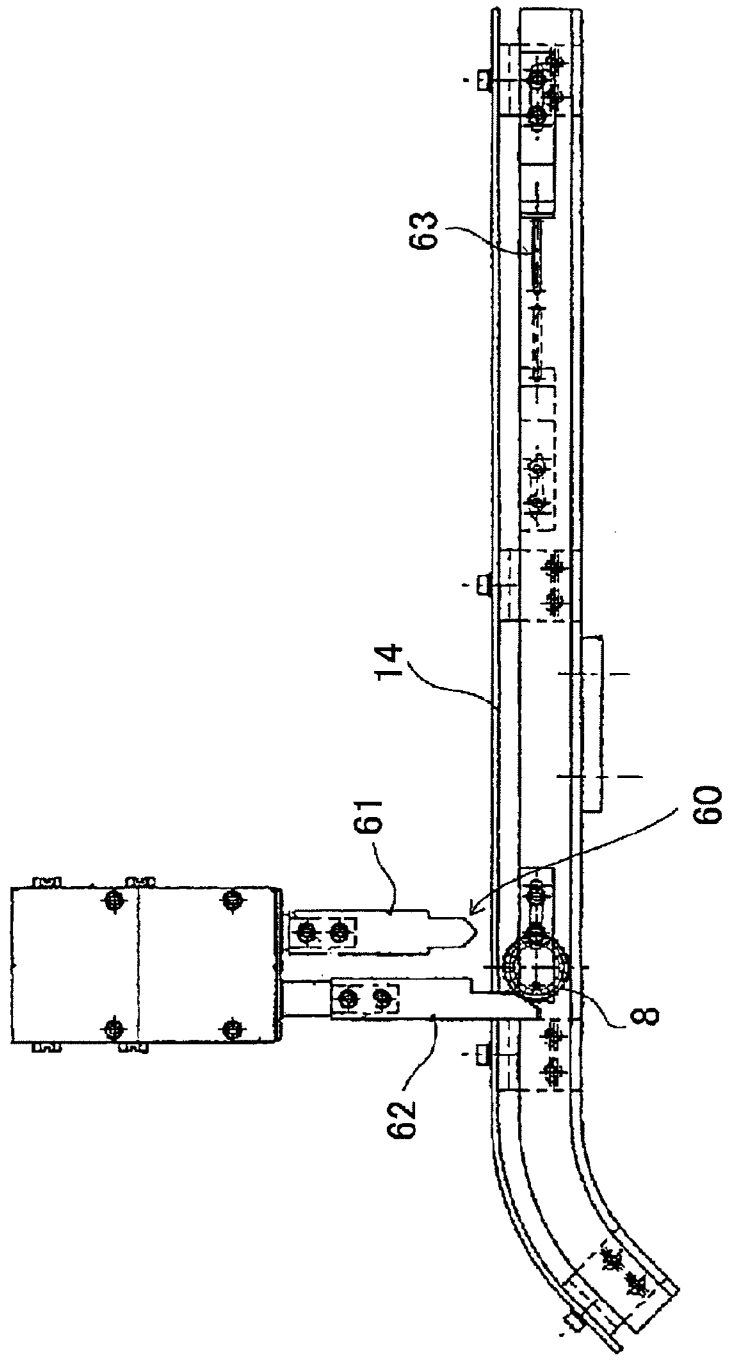
FIG. 6 A front view of the IC tag dropping chute and feeding mechanism section according to an embodiment of the present invention.

FIG. 6 shows an IC tag dropping chute and a separating mechanism section according to an embodiment of the present invention. Referring to FIG. 2 through FIG. 6, the IC tag dropping chute 14 is provided with a separating mechanism 60 including a pair of stoppers 61, 62 adapted to alternately take protruding and withdrawing actions and a temporary stop detection sensor opposing to the dropping chute 14 at the position of the separating mechanism 60 and detecting a temporary stop of the wireless IC tags to regulate the operation of the separating mechanism 60. In addition, the IC tag dropping chute 14 is further provided with a counting sensor 63 for detecting the passages of wireless IC tags at a position locating the upstream side from the separating mechanism 60 to thereby count the number of the wireless IC tags which have passed the position.

Following to counting the number of the wireless IC tags by means of a counting sensor 63 provided to the dropping chute 14, the wireless IC tags 1 pass the upper stopper member 61 staying on the withdrawn position, then hit and contact to the lower stopper member 62 being in the protruded (advanced) state to stop there (the state shown in FIG. 6). In response to signals from the temporary stop detection sensor that detected the stop, the lower stopper member 62 withdraws from the dropping chute 14 to feed wireless IC tags. At the same time, the upper stopper member 61 advances toward the dropping chute 14 to block the dropping chute 14, thereby causing the subsequent wireless IC tags to stop. Then, the lower stopper member 62 advances simultaneously with withdrawal of the upper stopper member 61, which causes the lower stopper member 62 to stop wireless IC tags temporarily, and signals are output from the temporary stop detection sensor. In this procedure, the wireless IC tags 1 falling down in series on the dropping chute 14 are separated one by one and fed to the vertically-dropping passage.

Figure 3:
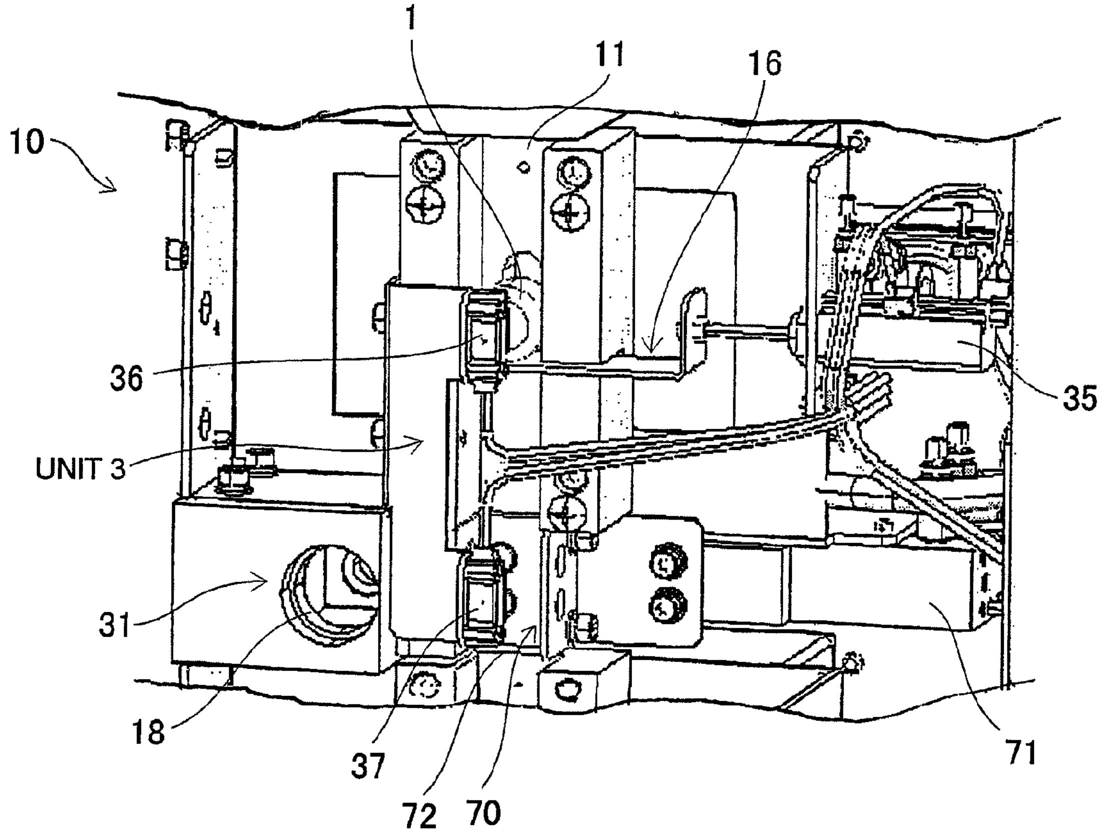
FIG. 3 A schematic enlarged planar view showing one unit section of the upright type apparatus for embedding wireless IC tags according to an embodiment of the present invention.

FIG. 3 is a front planar view showing the IC tag processing section disposed to the vertically-dropping passage for wireless IC tags according to the present invention. Referring to FIG. 2 and FIG. 3, a stopper 16 in a plate shape for opening and blocking the vertically-dropping passage 11 at a position slightly close to the upward from the corresponding pressure feeding section 33, 32, 31 is provided to each unit 1, 2, 3 in a manner being capable of advancing and withdrawing. Note that hereinafter, the movement in the direction of blocking the vertically-dropping passage 11 shall be called "stopper advancing", and the movement in the direction of opening the vertically-dropping passage 11 is called "stopper withdrawing". A cylinder unit 35 is connected to the rear end of the stopper 16, the stopper 16 advances or withdraws so that it traverses the vertically-dropping passage 11 by actuating this cylinder unit 35.

When the stopper 16 advanced and the vertically-dropping passage 11 was blocked, wireless IC tags 1 dropping through the vertically-dropping passage 11 are placed on the stopper 16 to temporarily stop there. A data writing unit 36 (writer section) using a radio communication means is disposed at a position opposing to the temporary stop position of the wireless IC tags, where various data are written to the wireless IC tags 1. A distributing plate 72 adapted to be advanced and withdrawn (entering/exiting movement) by a distributing cylinder 71 of the distribution section 70 is provided under the stopper 16 so that it traverses the vertically-stopping passage 11, whereby the wireless IC tags written with data dropping from the position of the stopper due to opening action of the stopper 16 are received on the distributing plate 72 being in an advancing state. A data reading-out unit 37 (reader section) using a radio communication means is disposed so that it opposes wireless IC tags on the distributing plate 72 at the position of the distributing plate 72, whereby the data written to those wireless IC tags on the distributing plate 72 are read out by the data reading-out unit 37.

The data reading-out unit 37 has further function of inspecting the wireless IC tags dropping from the stopper position. When data is written without errors, the distributing plate 72 extends to the corresponding laterally-sided pressure feeding section 31 (33, 32) by virtue of actuation of the distributing cylinder 71, whereby the wireless IC tags on the distributing plate 71 are blown to the front side of the data reading-out unit by virtue of pressurized air ejected from the backside of the data reading-out unit and embedded to the mixing vessel (not shown) through the hose 19 (FIG. 1) connected to a blowing outlet 18 in the pressure feeding section 31. When data is not written soundly by the data writing unit 36, that is, when there is an error in the data writing, the distribution control section is actuated in response to a detection signal output by the data reading-out unit 37, whereby the distributing plate 72 is withdrawn by the distributing cylinder 71 to cause the wireless IC tags to drop to the area beneath the vertically-dropping passage 11 as defective IC tags so that they are received in the defective IC tag reception section 30 (tray).

As described above, both of the distributing cylinder 71 and the distributing plate 72 have function of distributing wireless IC tags as functional wireless IC tags and defective wireless IC tags. When wireless IC tags are processed by one unit (ex. the unit 2), the stoppers and the distributing plates associated with the other units (ex. the units 1, 3) are kept in a state having withdrawn from the vertically-stopping passage 11 until the processing of the wireless IC tags by the active unit 2 is completed. In this manner, a plurality of IC tag processing units disposed at the upper and lower stages repeat the above-described operations in order of proceeding from the unit at the upper stage to the unit at the lower stage in turn.

Further, a sensor unit (not shown) which includes a sensor for detecting the embedding of wireless IC tags 1 is provided to the distal end of the hose 19 adapted to be connected to an air blowing outlet 18 of each IC tag pressure feeding section 31, 32, 33. The sensor unit is fixed to the mixing vessel by means of a hook or the like so that it does not come undone easily. It will be possible to monitor the result of embedding wireless IC tags to the mixing vessel by unitizing the distal end of the hose and install a sensor mechanism thereto.

As described above, the present invention makes possible to drastically reduce tag clogging at the embedding outlet and free selection of setting site of the apparatus by configuring the apparatus in IC tag embedding structure using pressurized air through an air hose. Further, by virtue of unitizing the IC tag processing and embedding mechanism section to position the resultant units at the upper and lower stages, whereby constituting the upright type apparatus for embedding IC tags, it is enabled to reduce an area required for setting the apparatus and to easily alter the embedding amount of wireless IC tags by increasing or decreasing the numbers of the units depending upon the usages and the circumstances. Further, the position level to set the upright type apparatus for embedding wireless IC tags according to the present invention is not necessarily same as the level of the mixing vessel, it is even possible to directly set the apparatus to the ground to thereby secure the safeness in handling and to carry out the maintenance. Note that, though the IC tag processing units are constituted in three stages in the above-described embodiment, the present invention is not limited to such constitution, and it is certainly possible to constitute the units in an arbitrary numbers of stages depending on the size of the mixing vessel. Besides, the pressure of the pressurized air is normally set to several atmospheric pressures.

The apparatus for processing and embedding wireless IC tags according to the present invention is adapted to be switched on/off remotely. Furthermore, the operation of the power source for the apparatus for processing and embedding wireless IC tags according to the present invention is executable via the Internet. Consequently, it is possible to determine the operational condition of the apparatus for processing and embedding wireless IC tags according to the present invention at a place other than the operating site and to take an appropriate countermeasure promptly when a trouble has been developed.

Further, although this type of apparatus in the past have been constructed in such a structure that any workers or operators may handle various operations on the apparatus including switching-on of the power source, the apparatus according to this invention is so configured that various operations including data writing/reading-out on the apparatus are adapted to be permitted via ID input on the touch panel board, so that the operators and operating competence can be defined to thereby increase liability to the implementation of the apparatus. Moreover, it was required to modify the apparatus totally in the past when the shape of the IC tag to be embedded is altered. However, the present invention provides such an advantage that it is possible to take a measure to cope with such alteration in the shape by replacing only the relevant unit. In addition, when one unit goes wrong, it is possible to fix the apparatus by partially repairing only the wrong unit.

APPLICABILITY FOR INDUSTRIAL USE

The upright type apparatus for embedding wireless IC tags according to the present invention is structured by unitizing an IC tag processing section comprising an IC tag embedding mechanism section, a data writing/reading-out section, an error inspection section, etc. and positioning these units in a vertical direction, so that the area required for setting the apparatus can be reduced, and a number of wireless IC tags can be embedded over the wide range of a mixing vessel within a short time. Furthermore, when a part of the apparatus goes wrong, it is possible to fix the apparatus by repairing the unit containing the wrong part, and it is also possible to easily change the embedding amount of wireless IC tags by increasing/decreasing the numbers of the units to be operated depending on the circumstances.

The invention claimed is:

1. An upright type apparatus for embedding wireless IC tags, the upright apparatus comprising:

- a vibration alignment unit for aligning the wireless IC tags in the same direction by applying a vibrating force to the wireless IC tags;
- a separating unit for separating the wireless IC tags aligned by the vibration alignment unit and dropping the separated wireless IC tags one by one into a vertically-dropping passage;
- a plurality of IC tag processing units disposed along the vertically-dropping passage in a vertical direction;
- a plurality of IC tag pressure feeding sections disposed at a lateral side of the plurality of IC tag processing units, respectively; and
- a defective wireless IC tag reception section provided beneath the vertically-dropping passage,
- wherein each of the IC tag processing units includes:
  - a stopper section for opening/blocking the vertically-dropping passage;
  - a data writing section for writing data to the wireless IC tags dropped into the vertically-dropping passage by means of a first radio communication means when the wireless IC tags dropped into the vertically-dropping passage are blocked by the stopper blocking the vertically-dropping passage;
  - a distribution section disposed beneath the stopper section and adapted to receive and distribute the wireless IC tags to which data is written by the data writing section so that the wireless IC tags to which data is written by the data writing section are either (i) distributed to one of the IC tag pressure feeding sections or (ii) distributed to the defective wireless IC tag reception section; and
  - a data reading-out section for reading out data from the wireless IC tags received by the distribution section by means of a second radio communication means.

2. The upright type apparatus for embedding wireless IC tags according to claim 1, wherein, from among the plurality of IC tag processing units, IC tag processing units which are not in a state of processing the wireless IC tags are kept in an open state.

3. The upright type apparatus for embedding wireless IC tags according to claim 1, wherein processing operations of the wireless IC tags using the plurality of IC tag processing units are carried out in order of a processing operation performed by an uppermost positioned IC tag processing unit to a processing operation performed by a lowest positioned IC tag processing unit.

4. The upright type apparatus for embedding wireless IC tags according to claim 1, wherein the data reading-out section performs a defective IC tag detection function for detecting errors in data writing to the wireless IC tags received by the distribution unit.

5. The upright type apparatus for embedding wireless IC tags according to claim 4, wherein the distribution section distributes the wireless IC tags which are detected by the data reading-out section as having errors in data writing to the wireless IC tags to the defective IC tag reception section.

6. The upright type apparatus for embedding wireless IC tags according to claim 1, wherein the plurality of IC tag pressure feeding sections embed the wireless IC tags distributed to the plurality of IC tag pressure feeding sections into any of a liquid material, a viscous material, or a semisolid material contained in a mixing vessel.

7. The upright type apparatus for embedding wireless IC tags according to claim 1, wherein the plurality of IC tag pressure feeding sections embed the distributed wireless IC tags distributed to the plurality of IC tag pressure feeding sections into unhardened concrete, the unhardened concrete being prepared by mixing/kneading cement, water and aggregate, and the unhardened concrete being contained in a mixing vessel.

8. The upright type apparatus for embedding wireless IC tags according to claim 1,

- wherein the vibration alignment unit includes (i) a concave disc for receiving the wireless IC tags, (ii) a round feeding path formed at the outer periphery of the concave disc, and (iii) a vibration driving member,
- wherein the round feeding path includes (i) an IC tag inlet connected to the concave disc at one end of the round feeding path and (ii) an outlet connected to an IC tag dropping chute at another end of the round feeding path.

9. The upright type apparatus for embedding wireless IC tags according to claim 1, wherein the vibration alignment unit includes an opening to which a cartridge adapted to contain the wireless IC tags is detachably mounted.

10. The upright type apparatus for embedding wireless IC tags according to claim 1, wherein the separating unit drops the separated wireless IC tags into the vertically-dropping passage via an IC dropping chute, and wherein the IC dropping chute includes a counting means for counting the number of the separated wireless IC tags which have passed through the IC tag dropping chute.

11. The upright type apparatus for embedding wireless IC tags according to claim 1, further comprising a hose for embedding the wireless IC tags distributed to the plurality of IC tag pressure feeding sections, the hose being connected to the plurality of IC tag pressure feeding sections.

12. The upright type apparatus for embedding wireless IC tags according to claim 11, further comprising a sensor unit including a sensor mechanism for detecting embedding of the wireless IC tags distributed to the plurality of IC tag pressure feeding sections, the sensor unit being provided to a distal end of the hose, wherein the hose is connected to an air blowing output of the plurality of IC tag pressure feeding sections.

13. The upright type apparatus for embedding wireless IC tags according to claim 1, further comprising a power source for connecting/disconnecting power to the upright type apparatus for embedding wireless IC tags to control an operation status of the upright type apparatus for embedding wireless IC tags so that the operation status of the upright type apparatus for embedding wireless IC tags is remotely operated.

14. The upright type apparatus for embedding wireless IC tags according to claim 13, wherein, using the power source, the operation status of the upright type apparatus for embedding wireless IC tags can be operated based on ID input from a touch panel device.

15. The upright type apparatus for embedding wireless IC tags according to claim 1, wherein the first radio communication means is a non-contact type radio communication means which is electrically connected with a database in a wired or wireless manner, and wherein the first radio communication means outputs radio waves of a preset frequency band to carry out radio communication to antenna sections of the wireless IC tags dropped into the vertically-dropping passage, thereby writing product information data being stored in the database to the wireless IC tags dropped into the vertically-dropping passage.

16. The upright type apparatus for embedding wireless IC tags according to claim 1, wherein each of the wireless IC tags includes a substrate and a wireless IC tag chip mounted on the substrate, and wherein the wireless IC tag chip includes:

a power source section for receiving radio waves from the first radio communication means and radio waves from the second radio communication means, and resonating with the received radio waves to generate current;

an antenna section for carrying out radio communication at a preset frequency band; and a ferroelectric memory for performing data writing/reading out during the radio communication at the preset frequency band.

17. The upright type apparatus for embedding wireless IC tags according to claim 2, wherein the data reading-out section performs a defective IC tag detection function for detecting errors in data writing to the wireless IC tags received by the distribution unit.

18. The upright type apparatus for embedding wireless IC tags according to claim 3, wherein the data reading-out section performs a defective IC tag detection function for detecting errors in data writing to the wireless IC tags received by the distribution unit.

19. The upright type apparatus for embedding wireless IC tags according to claim 17, wherein the distribution section distributes the wireless IC tag which are detected by the data reading-out section as having errors in data writing to the wireless IC tags to the defective IC tag reception section.

20. The upright type apparatus for embedding wireless IC tags according to claim 18, wherein the distribution section distributes the wireless IC tag which are detected by the data reading-out section as having errors in data writing to the wireless IC tags to the defective IC tag reception section.

* * * * *